United States Patent [19]

Rupp et al.

[11] 4,383,632

[45] May 17, 1983

[54] RECORDING AND/OR REPRODUCING APPARATUS

[75] Inventors: Karl Rupp; Henricus Ruyten, both of Vienna, Austria

[73] Assignee: U.S. Philips Corporation, New York, N.Y.

[21] Appl. No.: 230,830

[22] Filed: Feb. 2, 1981

Related U.S. Application Data

[63] Continuation-in-part of Ser. No. 217,739, Dec. 18, 1980, abandoned.

[30] Foreign Application Priority Data

Dec. 21, 1979 [AT] Austria ................................. 8112/79

[51] Int. Cl.³ .......................................... B65H 17/20
[52] U.S. Cl. .................................................. 226/190
[58] Field of Search ............... 226/190, 176, 177, 180, 226/181, 186, 187; 242/206, 208–210

[56] References Cited

U.S. PATENT DOCUMENTS

| 3,669,331 | 6/1972 | Renold ................................. 226/176 |
| 3,689,076 | 9/1972 | McAlvay ......................... 226/176 X |
| 3,764,052 | 10/1973 | Scully ..................................... 226/176 |
| 3,877,627 | 4/1975 | Boase et al. ............................ 226/33 |
| 3,884,407 | 5/1975 | Sugimizo ................................ 226/90 |

Primary Examiner—Leonard D. Christian
Attorney, Agent, or Firm—David R. Treacy

[57] ABSTRACT

A capstan drive tape recorder having a pressure roller on an arm which is pivotable to hold the tape against the capstan. To move the arm between the operating and a rest position, the arm is connected by a spring to a lever, the arm and lever being pivotable about the same axis. An actuating device moves the lever to bring the pressure roller into engagement with a tape against the capstan. In moving the arm, the lever is first pivoted about one axis, and then about a second axis so that the mechanical advantage of the lever is changed between a ratio which moves the roller a considerable distance, and a ratio which biases the roller against the capstan.

10 Claims, 9 Drawing Figures

RECORDING AND/OR REPRODUCING APPARATUS

This is a Continuation-In-Part of application Ser. No. 217,739 filed Dec. 18, 1980, now abandoned.

BACKGROUND OF THE INVENTION

The invention relates to a tape recorder and/or playback apparatus (hereinafter referred to as a tape recorder), which comprises a capstan which cooperates with a pressure roller arranged on an arm to transport the tape. The arm for the roller is pivotable about a pivoting axis so as to enable the pressure roller to be moved between at least one rest position and an operating position, in which positions the pressure roller is respectively spaced from and positioned against the capstan. The arm is connected by a resilient element to a lever which is pivotable about pivoting axis together with the arm. For pivoting, the lever cooperates with an actuating device, the lever being also pivotable relative to the arm and by the tension of the resilient element urging the pressure roller against the capstan in the operating position. In an apparatus of this type, known from German Patent Specification No. 12 66 527, the arm and the lever are mounted so as to be pivotable only about one axis. Depending upon the selected lever transmission, this arrangement provides both the displacement to be performed by the actuating device for moving the pressure roller from the rest position to the operating position and the force to be produced by the actuating device for tensioning the resilient element, which provides the pressure for urging the pressure roller against the capstan. It is then often desirable that said displacement of the lever on which the actuating device acts is minimal and the force required for tensioning the resilient element is also minimal, which requirements are in principle conflicting in the case of a single lever.

SUMMARY OF THE INVENTION

It is the object of the invention to solve the problems described above and to provide a construction which requires a comparatively small displacement for actuating the lever in order to move the pressure roller from the rest position to the operating position and a comparatively small force in order to tension the resilient element which provides the pressure, for urging the pressure roller against the capstan.

According to the invention this is achieved in a tape recorder of the type described above type in that the lever is pivoted relative to the arm about a first and a second pivoting axis, which axes are situated at a smaller distance from the pressure roller than the common arm and lever pivoting axis. These pivoting axes form part of a first and a second pivoting arrangement respectively, whose pivoting functions can be disabled or enabled depending on the pivotal movement of the lever caused by the actuating device, the resilient element being stressed or released by the pivotal movement of the lever about the pivoting axis of the second pivoting arrangement. As a result, during the movement of the pressure roller from the rest position to the operating position and during the subsequent application by the pressure roller to the capstan a different pivoting axis is used for the lever, so that two different leverage ratios, or mechanical advantages, are obtained.

A first leverage ratio is operative for moving the pressure roller until it engages with the capstan and a second leverage ratio is operative when tensioning the resilient element in order to urge or bias the pressure roller against the capstan. Thus, the ratio may first be selected so that, with a comparatively small displacement for a lever arm of the lever on which the actuating device acts, a large displacement of the pressure roller can be obtained in order to move this roller from the rest position to the operating position, after which the resilient element for biasing the pressure roller against the capstan is stressed by a different lever ratio with a smaller force of the actuating device. Since the pivoting function of the first pivoting arrangement is not operating until the pressure roller has engaged with the capstan and, subsequently, the pivoting function of the second pivoting arrangement is not operative until the lever has pivoted about the pivoting axis of the first pivoting arrangement, it is ensured that during the pivotal movement of the arm and lever about the common pivoting axis the first and the second pivoting arrangement do not impair the movement of the pressure roller from the rest position to the operating position. This enables said displacement of the pressure roller to be selected arbitrarily large.

In a preferred embodiment the first pivoting arrangement is constituted by a loose pin and hole connection provided between the arm and the lever, the clearance between the pin and the hole being such that the pin can be made to disengage from the wall of the hole, thereby rendering the pivoting function of the pivoting arrangement inoperative. Thus, the pivoting function of the first pivoting arrangement can easily be enabled or disabled.

In this same embodiment the second pivoting arrangement may advantageously be constituted by a hook connected to the lever and an abutment arranged on the apparatus, the abutment comprising a nose which is situated in the pivoting path of the hook when the lever is pivoted about the pivoting axis of the first pivoting arrangement. In this way the pivoting function of the second pivoting arrangement can be rendered operative or inoperative in a reliable manner. The hook may for example be rigidly connected to the lever, the point where the hook acts on the nose constituting the pivoting axis of the second pivoting arrangement.

In a different embodiment having a hook for the second pivoting function, the pivoting axis of the second pivoting arrangement is formed by a hinge in the connection between the hook and the lever, which hinge extends parallel to the pivoting axis of the first pivoting arrangement. A further pin, on the lever near the hinge, extends parallel to the pin of the first pivoting arrangement. This further pin is positioned against a guide surface which forms part of the arm, and the further pin is guided along this surface when the lever is pivoted about the pivoting axis of the first pivoting arrangement. The guide surface also serves as an abutment against which the further pin is pressed when the lever is pivoted further. As a result of this, the pivoting axis of the second pivoting arrangement is no longer constituted by the point of the hook which engages with the nose and which is spaced from the lever, but by the further pin which engages by the guide surface is restrained by the hook against sliding any farther along the guide surface, so that the pivoting axis of the second pivoting arrangement is situated nearer the lever. This has the advantage that when the resilient element is stressed the lever does not perform a movement relative to the arm carrying the pressure roller in the longitudinal direction of the lever, so that the resilient element is stressed without its spring axis being shifted significantly. For the cooperation of the hook with the nose when the lever is moved about the pivoting axis of the first pivoting arrangement, the hinge may be constituted by a strip-shaped integral hinge, which ensures that in the rest position of the pressure roller the hook occupies a preferred position. In its unloaded condition such an easy-to-manufacture strip-shaped integral hinge always resumes one specific preferred position. Suitably, in order to obtained the preferred position defined by the integral hinge, the hook is resiliently held against a stop provided on the lever. This results in a simple construction for the hinge and an accurately defined preferred position for the hook.

In yet another embodiment the second pivoting arrangement comprises a projection on the lever and an abutment on the apparatus, the projection on the lever being constituted by a finger-like extension whose free end extends parallel to the pivoting axis of the first pivoting arrangement. The abutment on the apparatus is constituted by a grooved support which extends parallel to the pivoting axis of the first pivoting arrangement and is situated in the pivoting path of the free end of the extension finger when the lever is pivoted about the last-mentioned pivoting axis. This also yields a simple construction and provides a reliable second pivoting arrangement for the lever.

It is also advantageous if at least when the arm is pivoted about the common pivoting axis the lever is positioned against the arm, and a disengageable latching device between the lever and the arm maintains this position. This ensures that the arm and the lever cannot inadvertently be pivoted relative to each other as long as the pressure roller has not yet reached the operating position. For example, such a latching device may be constituted by a ball-latching device between the arm and the lever. However, it is found to be particularly simple if the latching device is constituted by a resilient further hook.

According to another advantageous aspect of the preferred embodiment, a contact finger on the arm slidably bears on a supporting surface provided on the apparatus near the capstan. This surface extends perpendicularly to the capstan and the contact finger presses against it in the direction of the free end of the capstan. The resilient element which acts between the arm and the lever is arranged obliquely, the spring axis substantially passing through the intersection of a straight line through the contact point of the contact finger with the supporting surface, at right angles to the supporting surface and the plane of symmetry of the pressure roller, which plane extends perpendicularly to the capstan when the pressure roller is in the operating position. In this way it is achieved that the contact finger, which bears on the supporting surface, takes up force components which act in the direction of the capstan and that the pressure roller is consequently urged against the capstan, as is desired, by a force which acts in the plane of symmetry of the pressure roller, which plane extends perpendicularly to the capstan, thereby ensuring a correct record-carrier transport.

The invention will now be described in more detail with reference to the drawings, which show some embodiments of the invention given by way of example.

BRIEF DESCRIPTION OF THE DRAWING

FIG. 2 is a view which illustrates a first rest position with a pressure roller which is pivoted comparatively far away from the capstan.

FIG. 3 is a view which shows a second rest position in which the pressure roller has been moved to a position comparatively close to the capstan.

FIG. 4 is a view which represents a situation in which the pressure roller is positioned against the capstan, but in which the resilient element, which provides the pressure force, is not yet tensioned and the lever is pivotable relative to the arm by means of a first pivoting arrangement.

FIG. 5 is a view which represents a situation similar to that of FIG. 4, but in which the lever has been moved so far relative to the arm that the pivoting function of a second pivoting arrangement for the lever is established with a hook arranged on the lever and cooperating with a nose on the apparatus.

FIG. 6 is a view which the operating position of the pressure roller with the lever pivoted by means of the second pivoting arrangement and with the resilient element tensioned for urging the pressure roller against the capstan.

FIG. 7 is a sectional view taken on the line VII—VII in FIG. 6.

DESCRIPTION OF THE PREFERRED EMBODIMENTS

Figure 1:
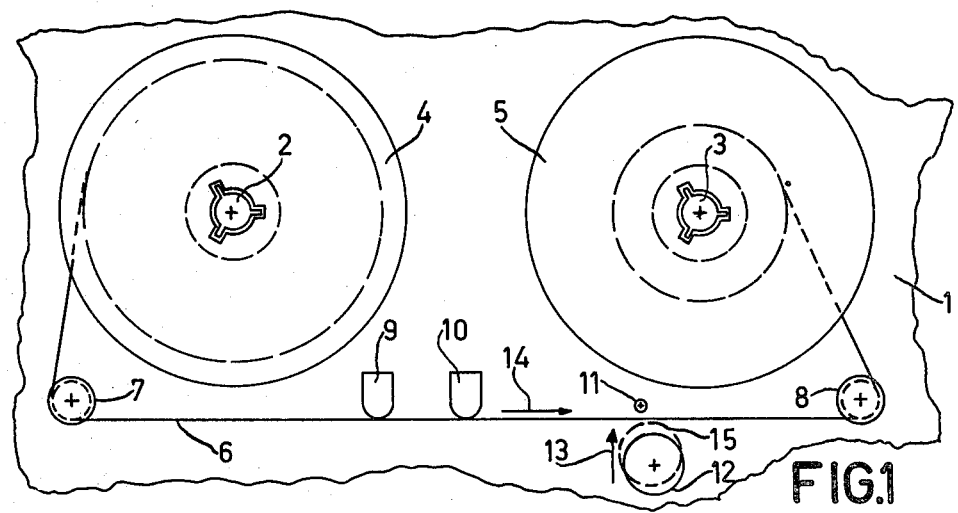
FIG. 1 is a plan view of a part of a recording and/or reproducing apparatus in accordance with the invention, showing the path of a record carrier between the capstan and a pressure roller adapted to cooperate therewith.

FIG. 1 shows a chassis 1 of a recording and/or reproducing apparatus, which carries optionally drivable winding spindles 2 and 3, onto which reels 4 and 5 can be placed. The reel 4 serves as supply reel for a record carrier 6 which is thereby placed on the recorder. The tape or carrier is fed to the reel 5, which serves as take-up reel, over two guide rollers 7 and 8. In the path between the guide rollers 7 and 8 the record carrier 6 passes the magnetic heads 9 and 10, and also passes between a capstan 11, which is adapted to be driven by a motor, and a pressure roller 12. In FIG. 1 the pressure roller 12 is shown in a rest position, in which the roller is pivoted comparatively far away from the capstan 11, thus enabling the record carrier to be readily inserted between the capstan and the pressure roller without record carrier transport taking place. When the pressure roller 12 is moved into the operating position in the direction of the arrow 13, in which position the roller is biased toward the capstan and against the record carrier between the roller and the capstan 11, the record carrier 6 is moved in the direction of the arrow 14, and is unwound from the supply reel 4 and taken up by a motor-driven take-up reel 5.

The rest position of the pressure roller 12, shown in FIG. 1, corresponds to a STOP mode of the apparatus. In the customary manner the pressure roller 12 also has a second rest position, in which the roller is situated at a small distance from the capstan 11. This second rest position of the pressure roller 12, which is schematically represented by a dashed circle 15 in FIG. 1, corresponds to a PAUSE mode of the apparatus. The record carrier is still not transported, but only a small displacement from this second rest position of the pressure roller 12 is required in order to press the roller rapidly against the capstan 11, thereby setting the record carrier into motion. For the present invention it is irrelevant whether there is or there is not such a second rest position of the pressure roller 12, because the invention specifically relates to steps which enable a pressure roller to be moved over a comparatively large distance between a rest position and an operating position and to be pressed against the capstan in the last-mentioned position. However, for the sake of completeness such a second rest position of the pressure roller 12 is also described hereinafter.

When the pressure roller 12 is positioned against the capstan 11, the roller should press against the capstan with a specific force in order to ensure that the record carrier 6 is correctly driven. This force for pressing the pressure roller 12 against the capstan 11 is obtained in the customary manner by stressing a resilient element, which may take the form of either a compression or a tension spring. For moving the pressure roller there is generally provided a lever, which in its turn can be moved by an actuating device. Therefore, such an actuating device should first provide a comparatively large displacement for the pressure roller 12, for which only small forces are required, because the movement of the pressure roller encounters substantially no resistance and then the actuating device should provide a comparatively great force in order to stress the spring, which urges the pressure roller against the capstan. These are two operations with different functions, namely to provide movement over a large distance and to provide a great force. Furthermore, such an actuating device should perform these operations with a minimal displacement of the actuating device, in order to simplify the construction of the actuating device itself.

In accordance with the invention the foregoing requirements are met in that during the movement of the pressure roller, namely after this roller has been positioned against the capstan, the transmission ratio of a lever is automatically changed. This lever which is pivotable by the actuating device, moves the pressure roller, and then presses the roller against the capstan. In the embodiments in accordance with FIGS. 2 to 7 the pressure roller 12 is mounted on an arm 17 so as to be pivotable about a spindle 16, which arm in its turn is pivotable about the axis 18a of a spindle 18 on the apparatus.

Figure 2:
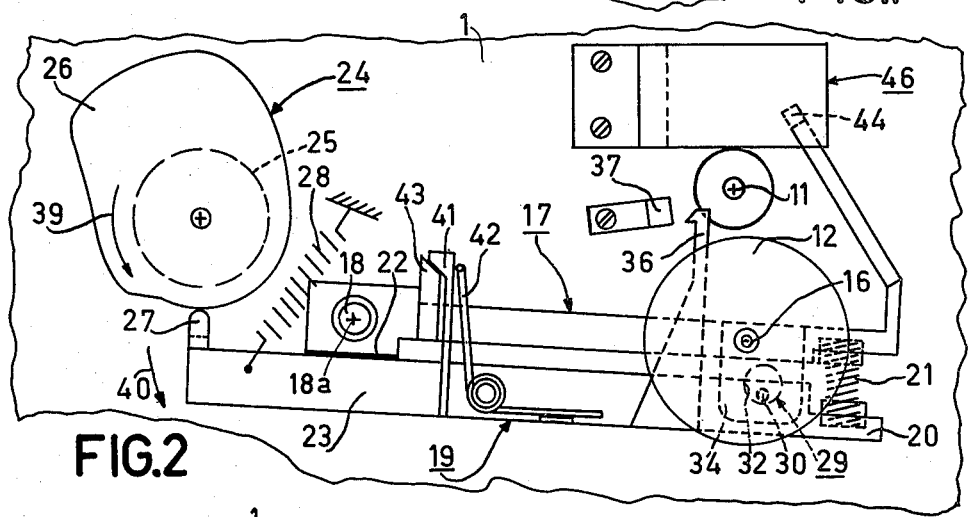
FIGS. 2 to 7, for a first embodiment of an apparatus in accordance with the invention, are partially schematic views which illustrate separate stages in the movement of a pressure roller, which is arranged on an arm and which is pivotable by means of a lever, from the rest position into the operating position, of which Figures

FIG. 2 shows the pressure roller 12 in the first rest position, in which the roller is positioned comparatively far from the capstan 11. A lever 19 is pivotably arranged on the arm 17. Between one lever arm 20 of the lever 19 and the arm 17 there is arranged a resilient element constituted by a compression spring 21 which, during this mode of recorder operation, holds the lever 19 against the arm 17. The arm 17 and the lever 19 extend adjacent each other and a side surface 22 of the arm 17 serves as a stop for an arm portion 23 of the lever 19. The recorder also includes an actuating device 24 which comprises a cam disc 26 driven by a motor 25. A pin 27 arranged on the portion arm 23 of the lever 19 is urged against the circumference of the cam disc under the influence of a spring 28 acting on the lever 19, so that the lever 19 follows the shape of the cam disc 26. Obviously, the actuating device 24 may be of a different construction, for example in the form of a push-button control or a solenoid control.

For pivotably arranging the lever 19 with respect to the arm 17 a first pivoting arrangement 29 is constituted by a pin and oversized hole connection. For the sake of clarity, a considerable part of the pressure roller 12 is cut away in FIG. 3 in order to show this pivoting arrangement, which also shown in side view in FIG. 7. The pin and hole connection shown has two coaxial pins 30 and 31 arranged on the lever 19 and passing through two respective holes 32 and 33, which are formed in tabs 34 and 35 respectively. The tabs 34 and 35 project laterally from the arm 17 and the lever 19 extends between them. The clearance between the holes 32 and 33 and the pins 30 and 31 is such that the pins can be made to disengage from the walls of the holes as described below, thereby disabling the pivoting function of the first pivoting arrangement. In the rest position of the pressure roller the spring 21, which acts between the arm 17 and the lever arm 20 of the lever 19, urges the pins against the walls of the holes, so that the first pivoting arrangement is operative and defines a pivoting axis 29a for the lever 19 relative to the arm 17. In the rest position of the pressure roller the lever 19 also bears against the stop 22 of the arm 17 with the lever arm 23, so that the lever 19 and the arm 17 constitute an assembly which is pivotable about the common pivoting axis 18a of the lever 17, without operation or utilization of the pivoting function of the first pivoting arrangement 29.

Figure 5:
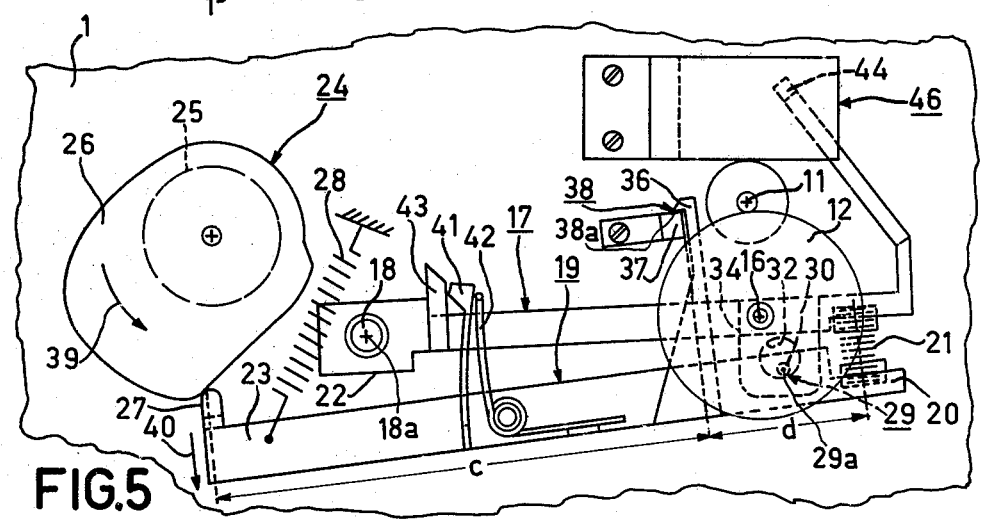
Figure 6:
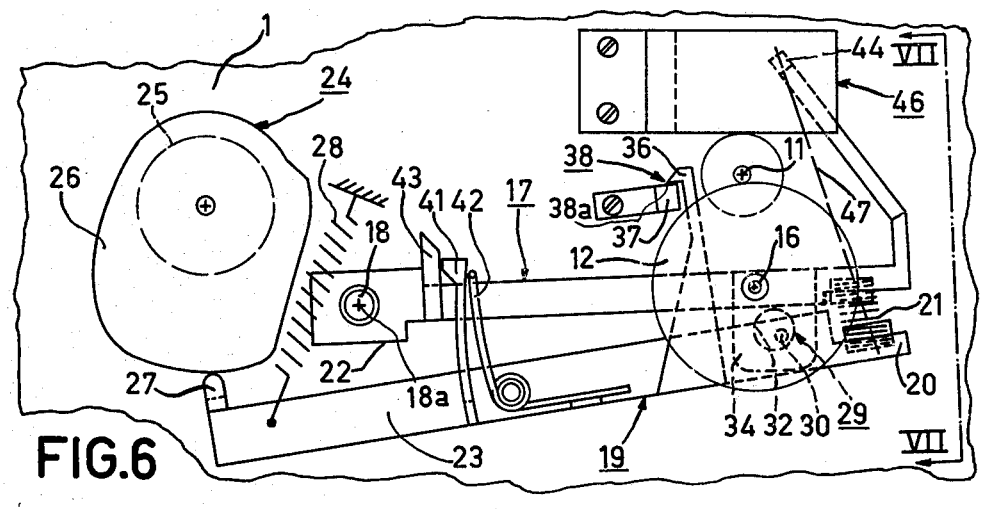

In the area adjacent the first pivoting arrangement 29, the lever 19 comprises a projection, which extends substantially transversely of the lever and in the present embodiment is constituted by a hook 36 which is rigidly connected to the lever 19. A fixed abutment having a nose 37 in the form of an L-shaped member is mounted to the chassis 1 for engagement by the hook 36 when the lever 19 is pivoted about the first pivoting arrangement 29. The hook 36 then butts against and overhangs the nose 37 so that the hook is retained as shown in FIGS. 5 and 6. In this way a second pivoting arrangement 38 for a further pivotal movement of the lever 19 is formed, the first pivoting arrangement 29 between the lever 19 and the arm 17 then being rendered inoperative because the pins 30 and 31 are disengaged from the wall of the respective holes 32 and 33 of the pin and oversize hole connection.

Figure 4:
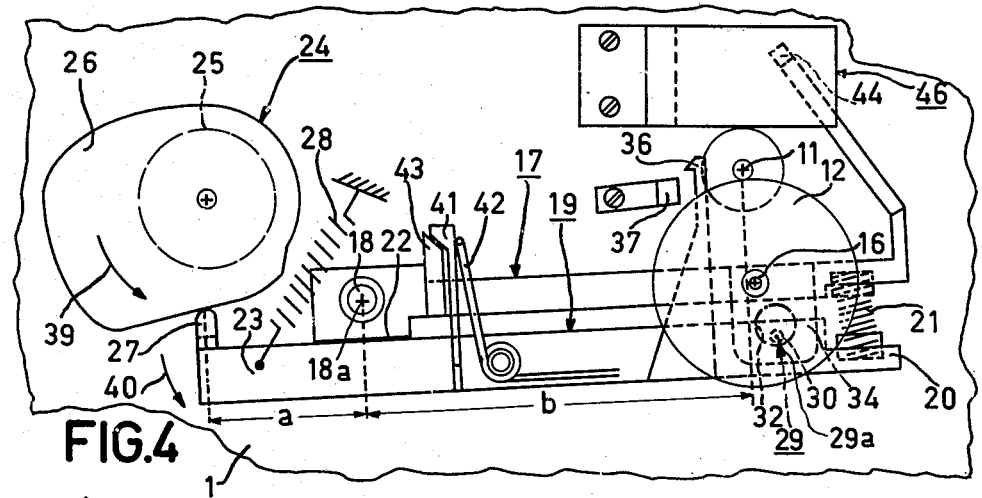

Hereinafter, a more detailed description is given of the operation during the movement of the pressure roller 12 from the first rest position, as shown in FIG. 2, to the operating position (FIG. 6), in which the pressure roller is urged against the capstan 11 under the influence of the spring 21. The pivotal movement of the pressure roller is initiated by switching on the motor 25 of the actuating device 24 by controls, not shown, on the apparatus. This may for example be effected by means of a push-button control of the apparatus or by means of a microprocessor which controls the various functions of the apparatus. When the motor 25 is switched on the cam disc 26 begins to rotate in the direction of the arrow 39. Since the pin 27 of the lever 19 is urged against the cam disc 26 by the spring 28, the lever 19 will follow the shape of the cam disc 26, the lever arm portion 23 being pivoted accordingly in the direction of the arrow 40. During this phase of the movement the lever 19 and the arm 17 are coupled to each other under the influence of the spring 21 and first pivoting arrangement 29, and latching device to be described below, so that they are jointly pivoted about the common pivoting axis 18a. Thus, for the movement of the pressure roller 12 a mechanical advantage a:b is obtained as is indicated in FIG. 4. As can be seen, the distance a is smaller than the distance b, so that a small displacement of the cam disc 26 results in a large displacement of the pressure roller 12.

In order to ensure that during this movement the arm 17 and the lever 19 jointly pivot about the axis 18a and the lever arm portion 23 of the lever 19 is positioned against the stop 22 of the arm 17, the action of the spring 21, by means of which this is realized, is assisted by a further hook 41 on the lever 19, which further hook engages with its hook-shaped end behind a projection 43 on the arm 17 under the influence of a spring 42 arranged on the lever 19. In this way a disengagable latching device is formed between the arm 17 and the lever 19, which ensures that the lever arm 23 is positioned against the stop 22 of the arm 17. Such a latching device may also be realized in a different way, for example by means of a ball-latching device. Furthermore, the hook 41 and the spring 42 may be arranged on the arm 17 and the projection 43 on the arm 19.

Figure 3:
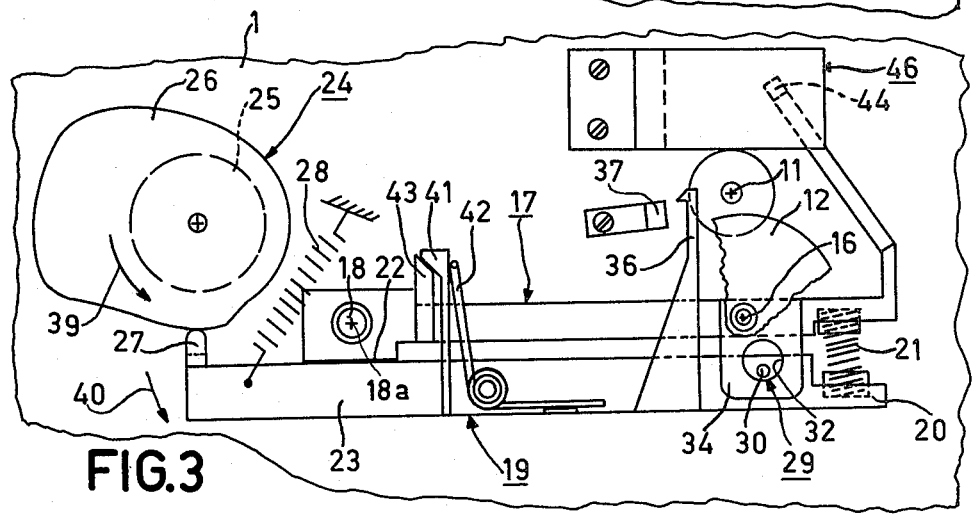

As described, the pressure roller 12 is moved in the direction of the capstan 11 with a mechanical advantage a:b, the pressure roller assuming the second rest position shown in FIG. 3. Depending on whether the actuating device 24 is switched off at this instant or remains switched on, the pressure roller 12 will remain in this second position or is moved further in the direction of the capstan 11. If the pressure roller 12 is moved further in the direction of the capstan 11, it is ultimately positioned against the capstan 11. Ths movement phase is shown in FIG. 4. As soon as the pressure roller 12 is positioned against the capstan 11 the arm 17 is restrained and consequently cannot move further in that direction. As is shown in FIG. 4, the lever 19 has then reached a position in which the free end of the hook 36 on the lever, viewed from the lever 19, is positioned behind the nose 37 on the chassis 1, which acts as an abutment. When the pressure roller 12 is positioned against the capstan 11, the pressure roller has reached the operating position but does not yet exert an appropriate pressure on the capstan.

If the cam disc 26 advances further a suitable force is exerted on the lever 19 in order to obtain a further pivotal movement of the lever. Since the arm 17 is now restrained, the pivoting function of the first pivoting arrangement 29 between the lever 19 and the arm 17 becomes operative. This means that the lever 19 is further pivoted in the direction of the arrow 40 about the pivoting axis 29a which is determined by the first pivoting arrangement 29. The further hook 41 on the lever 19 is then disengaged from the projection 23 on the arm 17, so that the latching connection between the arm 17 and the lever 19 is released, the pivoting function about the spindle 18 for the lever 19 is inoperative and the lever 19 can thus be moved further. During this movement of the lever 19 the hook 36 comes into contact with the nose 37 and butts against that nose as is shown in FIG. 5.

As the hook 36 now bears against the nose 37, the pivoting function of the second pivoting arrangement 38 for the lever 19 becomes operative, and now defines a pivoting axis 38a for a further pivotal movement of the lever 19. Such a further pivotal movement of the lever 19 this results in a mechanical advantage given by the distances c:d indicated in FIG. 5. As c is greater than d, this mechanical advantage is such that a great force can be exerted on the lever arm 20 with the same force on the lever 23. This mechanical advantage is now used for stressing or tensioning the spring 21, in such a way that the force required for pressing the pressure roller 12 against the capstan 11 is obtained. For this purpose the lever 19 is pivoted further away from the cam disc 26, the pivoting function of the second pivoting arrangement 38 then being operative and the pivoting function of the first pivoting arrangement 29 in the arm 17 being disabled because the respective pins 30 and 31 come clear of the walls of the holes 32 and 33 respectively, as is shown in FIG. 6. The spring 21 is now stressed and the pressure roller 12 is urged against the capstan 11 with the desired force in the operating position.

It will be appreciated that during the movement of the pressure roller 12 from the rest position to the operating position the ratio of the parts of the lever 19 has changed. This change is such that with a first ratio the pressure roller is rapidly positioned against the drive spindle with a comparatively small stroke of the actuating device, after which with a second ratio the spring is tensioned with a comparatively small force of the actuating device in order to press the pressure roller against the capstan with the desired force.

In order to move the capstan from the operating position on the first or the second rest position the complete cycle of movements is now reversed, so in that the motor 25 drives the cam disc 26 in a direction opposite to that of the arrow 39. The spring 21 is first released, after which the pivoting function of the second pivoting arrangement 38 is disabled, and, the pivoting function of the first pivoting arrangement 29 is enabled until the lever 19 is again positioned with the arm portion 23 against the stop 22 of the arm 17. The hook 42 is latched behind the projection 43, so that the pivoting function of the spindle 18 for the lever 19 is restored, and finally by a common pivotal movement of the arm 17 and the lever 19 about the spindle 18 the pressure roller 12 is moved away from the capstan 11 into one of the two rest positions.

It is evident that there are several possibilities of constructing and arranging the arm 17, the lever 19 and the first and the second pivoting arrangements 29 and 38 in order to obtain the cycle of movements in accordance with the invention as described above. For example, the point where the actuating device 24 acts on the lever 19 may also be situated near the hook 41. Furthermore, the hook 36 may be arranged at another location on the lever 19. All these embodiments serve to obtain the desired ratios for the lever 19. Moreover, the arm 17 and the lever 19 may be arranged above each other, in which case for example the first pivoting arrangement 29 may comprise a pin and oversized hole connection with one pin and one hole. The shape of the hole for the pin-hole connection is largely arbitrary, when it is ensured that there is sufficient clearance for the pin to become disengaged from the wall of the hole, which is for example also possible in the case of a triangular hole, which enables the position of the pin in the operating condition of the first pivoting arrangement 29 to be defined very accurately by a corner of the triangular hole.

Figure 7:
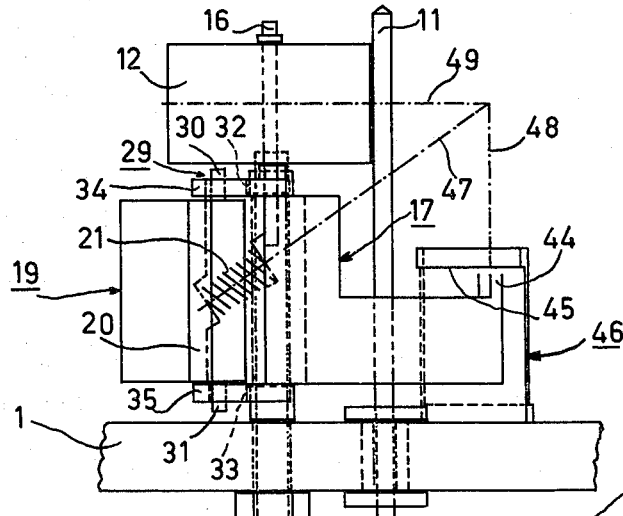

In order to ensure a precise record carrier transport, and particularly in order to preclude deviations of the record carrier in the transverse direction, it is of great importance that the pressure roller 12 is accurately pressed against the capstan 11. Therefore, the pressure roller should be applied with a force which acts in the plane of symmetry of the pressure roller, which plane extends perpendicularly to the capstan. In the preferred embodiments this would require a different location of the spring 21, which is not readily possible for constructional reasons. In order to solve this problem the spring 21, as can be seen especially in FIG. 7, is arranged to extend obliquely between the arm 17 and the lever arm 20 of the lever 19. Furthermore, a contact finger 44 is arranged on the arm 17, in such a way that, viewed in the direction of the free end of the capstan 11, the contact finger slides on a supporting surface 45 on the apparatus, which surface extends perpendicularly to the capstan 11. In the present embodiment this supporting surface 45 is constituted by an S-shaped bracket 46, which is secured to the chassis 1. In principle it is also possible to form the supporting surface 45 directly in the chassis or by an S-shaped tab which is bent out of the chassis. The spring 21 is then arranged so that in the operating position of the pressure roller 12 the axis 47 of the spring extends substantially through the intersection of a straight line 48, which passes through the contact point of the cam 44 with the supporting surface 45 and extends perpendicularly to the supporting surface 45, and the plane of symmetry 49 of the pressure roller, which plane extends perpendicularly to the capstan, as can be seen in FIG. 7.

In this way it is ensured that the force exerted by the spring 21 has two components, one component acting in the direction of the straight line 48 towards the free end of the capstan and the other component in the plane of symmetry 49. The force component in the direction of the straight line 48 then urges the finger 44 against the supporting surface 45 and is taken up by that supporting surface 45, so that this component does not assist in urging the pressure roller 12 against the capstan 11. The other force component of the force exerted by the spring 21, which component acts in the plane of symmetry 49 of the pressure roller, solely urges the pressure roller 12 against the caostan 11, thereby ensuring an accurate record carrier transport, specifically in the axial direction, because no undesired force component acting in the direction of the capstan is exerted.

Figure 8:
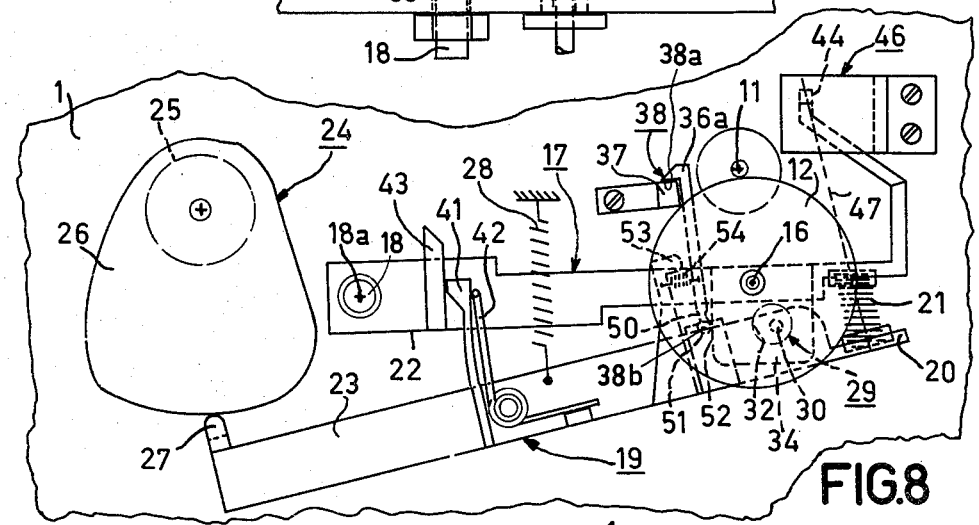
FIG. 8, in the same stage of movement as in FIG. 6, is a view which shows a second embodiment of an apparatus in accordance with the invention, a hook which is pivotably mounted on the lever providing the pivoting function of the second pivoting arrangement.

In the embodiment shown in FIG. 8, in which the pressure roller is shown in the operating condition, urged against the capstan, there is again provided a hook 36a cooperating with the nose 37 in order to obtain the second pivoting arrangement 38. The hook 36a is pivotably connected to the lever 19 by means of a hinge 50 which is parallel to the pivoting axis 29a of the first pivoting arrangement 29. Furthermore, near the hinge 50 the lever 19 is provided with a further pin 51 which extends parallel to the pin 30 and engages with a guide surface 32 formed on the side of the tab 34, which is connected to the arm 17. The further pin slides on the surface 52 when the lever 19 is pivoted about the pivoting axis 29a of the first pivoting arrangement 29, and the surface 52 then serves as an abutment for the further pin during a further pivotal movement of the lever 19. In principle, this guide surface 52 may also be constituted by a suitable slot in the tab 34.

In this way it is ensured that, in contradistinction to the first embodiment, the pivoting axis for the second pivoting arrangement is no longer constituted by the line where the hook 36 acts on the abutment 37 but by the pin 51 which bears on the guide surface 52 and which is retained by the hook 36a. However, the pivoting axis 38b of the second pivoting arrangement 38 is thus transferred in the direction of the lever 19, so that during a further pivotal movement, in order to tension the spring 21, the lever performs substantially no relative movement with respect to the arm 17 in the longitudinal direction of the lever 19. This has the advantage that the spring 21 is stressed without any significant displacement of the spring axis 47.

In order to ensure that when the lever 19 is pivoted about the pivoting axis 29a of the first pivoting arrangement 29, the hook 36a engages with the nose 37, the hook 36a should occupy a specific preferred position when the lever is not engaging with the nose 37, similarly to the hook 36 which is rigidly connected to the lever 19. Such a preferred position is effectively attained in that the hinge 50 is formed by a resilient strip integral hinge as shown in FIG. 8. Such an integral hinge is not only easy to manufacture, because the lever 19, the hinge 50 and the hook 36a may be formed by one plastic component, but also has the advantage that such an integral hinge always occupies a predetermined position in the unloaded condition and thereby provides a preferred position for the hook 36a. Moreover, in the present embodiment a stop 53 on the lever 19 defines the preferred position of the hook dictated by the integral hinge, against which stop the hook 36a is pulled by a spring 54, so that the preferred position of the hook 36a is unambiguously defined. FIG. 8 also shows that the hook 36a is situated at a small distance from the stop 53, which is the case when the second pivoting arrangement 38 is operative and the pressure roller 12 is urged against the capstan 11, because in that case the pivoting axis 38b of the second pivoting arrangement is constituted by the pin 51 which engages with the guide surface 52 and which is retained by the hook 36a.

In the present embodiment the various movements for moving the pressure roller from one of the rest positions to the operating position take place in the same way as in the embodiment described in the foregoing with reference to FIGS. 2 to 6.

Figure 9:
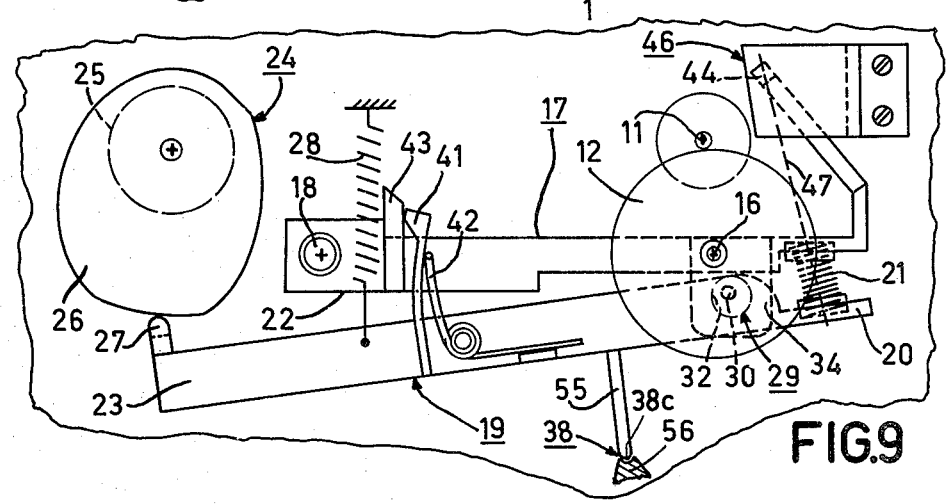
FIG. 9, in the same stage of movement as in FIG. 6, is a view which shows a third embodiment of an apparatus in accordance with the invention, a finger arranged on the lever and cooperating with a grooved support providing the pivoting function of the second pivoting arrangement.

In the embodiment of FIG. 9 the projection on the lever 19 for forming the second pivoting arrangement 38 is constituted by a finger-like extension 55 whose free end extends parallel to the pin 30 of the first pivoting arrangement 29. In this case the abutment on the apparatus is constituted by a grooved support 56 situated in the pivoting path of the free end of the extension 55, which during the pivotal movement of the lever 19 about the pivoting axis 29a of the first pivoting arrangement 29 extends parallel to the pivoting axis of the first pivoting arrangement 29. As soon as the pressure roller 12 is positioned against the capstan 11 and the lever 19 is pivoted about the pivoting axis 29a of the first pivoting arrangement 29, the free end of the extension 55 engages the groove in the support 56 and bears in that groove. Thus, the pivoting function of the second pivoting arrangement 38 for the lever 19 is established, which enables the lever 19 to be pivoted further about a pivoting axis 38c the pivoting function of the first picoting arrangement 29 being disabled by disengagement of the pin 30 from the wall of the hole 32. During the further pivotal movement of the lever 19 the spring 21 is then stressed again and the pressure roller 12 is urged against the capstan 11. The further movements for moving the pressure roller from one of the rest positions to the operating position correspond to the movements as described for the embodiment discussed with reference to FIGS. 2 to 7.

We claim:

1. A tape recorder comprising:
    a capstan for transporting a tape placed on the recorder,
    a pressure roller arranged on an arm for pressing the tape against the capstan, said arm being pivotable about a pivot axis for movement of the roller between at least one rest position and one operating position,
    a lever arranged to be pivotable about said pivot axis together with the arm, and also pivotable with respect to said arm,
    a resilient element connecting said lever to said arm, and arranged such that in the operating position the resilient element biases the roller against the capstan, and
    an actuating device arranged for cooperation with the lever to pivot the lever,
    characterized in that the recorder includes first and second pivoting arrangements, defining respective first and second pivoting axes against which the lever is pivotable relative to said arm, the distance between the pressure roller and said pivot axis being greater than the respective distances between the roller and said first and second axes,
    said arrangements include means, responsive to the pivotal movement of the lever caused by the actuating device, for enabling and disabling the pivoting functions about said first and second axes, and
    said resilient element is arranged such that it is stressed for biasing or released in response to pivotal movement of the lever about said second axis.

2. A recorder as claimed in claim 1, characterized in that the first pivoting arrangement comprises a pin and oversized hole connection arranged between the arm and the lever, the clearance between the pin and the hole being such that the pin can be disengaged from the wall of the hole as a result of pivoting of the lever about the second axis, thereby disabling the pivoting function of the first pivoting arrangement.

3. A recorder as claimed in claim 1 or 2, characterized in that the second pivoting arrangement comprises a hook connected to the lever and an abutment arranged on the recorder, the abutment having a nose which is disposed in the path of the hook when the lever is pivoted about the first pivoting axis so that the hook can butt against and overhang the nose.

4. A recorder as claimed in claim 3, characterized in that it comprises a hinge connecting the hook and the lever, the hinge having a hinge axis parallel to the first pivoting axis, and
    the second pivoting arrangement comprises a further pin mounted to the lever near said hinge and extending parallel to the pin of the first pivoting arrangement, and a guide surface which forms part of the arm, so arranged that said further pin is pressed against and guided along said guide surface as the lever is pivoted about the first pivoting axis, and said guide surface serves as an abutment against which said further pin is pressed when the lever is pivoted further.

5. A recorder as claimed in claim 4, characterized in that the hinge is a resilient strip integral hinge, thereby causing the hook to have a preferred position when the roller is in the rest position.

6. A recorder as claimed in claim 5, characterized in that the lever includes a stop, and the second pivoting arrangement includes means for resiliently holding the hook against said stop when the hook is not engaging said abutment.

7. A recorder as claimed in claim 1 or claim 2, characterized in that the second pivoting arrangement comprises a projection disposed on the lever and an abutment arranged on the recorder, the projection being a finger-like extension having a free end which extends parallel to the first pivoting axis, and the abutment on the recorder has a groove extending parallel to the first pivoting axis and situated in the path of the free end of the finger as the lever is pivoted about the first pivoting axis.

8. A recorder as claimed in claim 1 or 2, characterized by comprising a disengagable latching device interconnecting the arm and the lever for maintaining the lever position against the arm during pivotal movement of the arm about said pivot axis.

9. A recorder as claimed in claim 8, characterized in that the latching device comprises a resilient further hook which is disengaged upon movement of the lever past a position in which the pressure roller first engages the capstan.

10. A recorder as claimed in claim 1 or 2, characterized in that the arm includes a contact finger and the recorder includes a supporting surface disposed near the capstan, the contact finger having a free end which bears slidably against the supporting surface at a point of contact,
    said pressure roller is symmetrical about a plane extending perpendicular to the capstan in the operating position of the pressure roller, and
    said resilient element is arranged to act along an oblique line between the arm and the lever, said oblique line passing substantially through the intersection of the plane of symmetry with a line perpendicular to said supporting surface at said point of contact.

* * * * *